Aug. 10, 1937.   H. W. MITCHELL   2,089,917
ELECTRICAL TESTING DEVICE
Filed Sept. 5, 1935

Witness:
Martin H. Olsen

Inventor:
H. Walter Mitchell

Patented Aug. 10, 1937

2,089,917

UNITED STATES PATENT OFFICE 2,089,917

ELECTRICAL TESTING DEVICE

Henry Walter Mitchell, Chicago, Ill., assignor to Emil A. Stromberg, Chicago, Ill.

Application September 5, 1935, Serial No. 39,223

16 Claims. (Cl. 175—183)

This invention relates to improvements in electrical testing devices for transformers of various types, and is more particularly directed to an electrical testing system employing a plurality of circuits, which are selectively controlled in conjunction with a plurality of contact making and breaking elements having an indicating means therefor, the circuits and elements being arranged in a novel manner, that various types of transformers may be tested for efficiency at different saturation periods, when the transformer is coupled up in circuit with the device.

The chief objects of the invention are the provision of an improved electrical testing device that is simple in construction, strong and durable and inexpensive to manufacture, and which may be easily and readily attached to a transformer for testing its primary and secondary circuits under various conditions to which it is subjected while in use.

A further object is the provision of a testing device provided with manipulative means for selecting circuits having contact making and breaking elements therein, which are arranged in a novel manner for pre-determined purposes to enable the testing of the transformer primary saturation time frequency under any of its output capabilities.

A still further object is the provision of a timing element which may be selectively connected in the circuit for heating the transformer under normal running conditions for a given length of time and which will automatically break the circuit after the transformer has been heated.

Other objects and advantages of the present invention will become apparent from the following description, reference being had to the accompanying drawing in which the invention is clearly shown:

Figure 1:
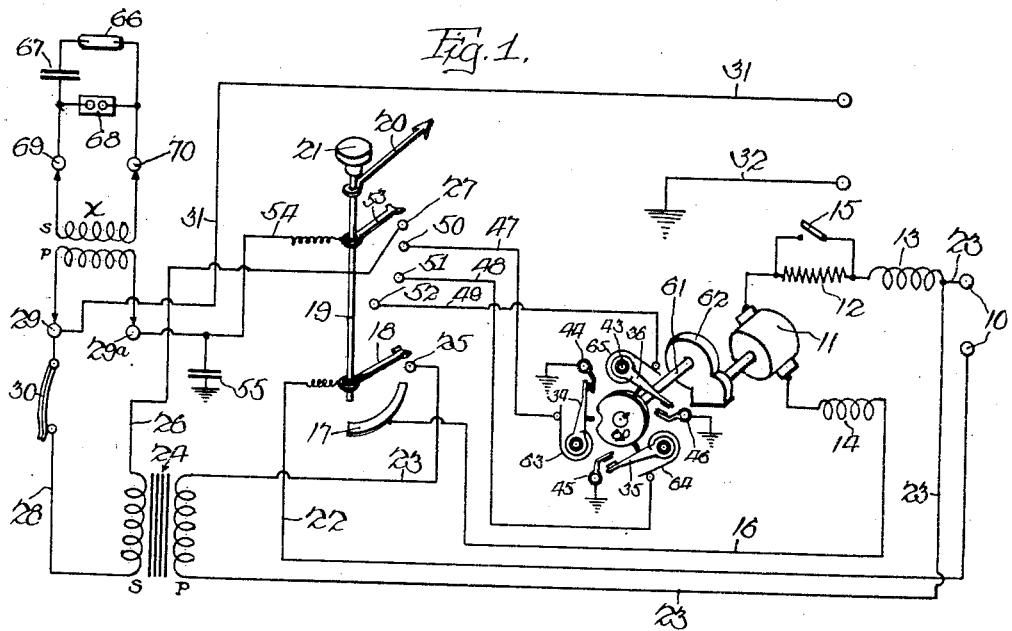
Figure 1 is a wiring diagram of the electrical testing device embodying my invention.

Referring to the drawing in detail and first to the circuit of Fig. 1, the reference numeral 10 designates a 110 volt A. C. line to which a variable speed motor 11 is connected. A resistance 12 may be connected between the fields 13 and 14, respectively, of the motor, as illustrated. A switch 15 is wired around the resistance 12 and is adapted to be manually operated to vary the speed of the motor 11. A lead 16 connects the field 14 to a wiper-plate 17 on which the wiper 18 may be moved, and which is insulated from and carried on a shaft 19 that is provided with an indicator 20 and knob 21 for turning the shaft. A lead 22 extends from the wiper 18 back to the source 10 to complete the circuit. Lead 23 extends from the 110 volt line through the primary coil P of a transformer 24 and to a contact member 25 which is adapted to be engaged by the wiper 18 to complete the circuit.

The secondary S of the transformer 24 connects with a lead 26 that extends to a terminal 27, the other end of the secondary having a lead 28 extending to a terminal 29 and has a heating mechanism 30 of thermostatic material which serves to complete the heating circuit and for breaking the same after a given length of time. The mechanism 30 is arranged as a switch for closing the secondary circuit, and when properly heated, the thermostatic material will yield to open the circuit. As the thermostatic control switch 30 is gradually heated, it will break the heating circuit through the secondary of the transformer 24. This heating of the transformer X is similar to that encountered in service under its normal operating conditions.

An interrupted six volt battery circuit or test circuit may also be connected to the test terminals 29ª and 29, the lead 31 extending to the terminal 29 and the lead 32 being connected to terminal 29ª through a ground and an interrupting device described hereinafter.

The transformer X to be tested has its primary connected to the terminals 29 and 29ª and when the thermostatic switch 30 is closed, alternating current passes from the secondary of the transformer 24 through the primary winding of the transformer X under test. This heats the transformer X preparatory to test.

A plurality of contact making and breaking elements 33 are arranged in the battery circuit, and comprise the breaker arms 34, 35 and 36 which are carried on a plate member 37 and are provided with contact points 38, 39 and 40, respectively, and are pivotally mounted on the studs 41, 42 and 43, respectively, being adapted to engage similar contact points 44, 45 and 46, respectively, carried in fixed relation with respect to the breaker arms on the plate member 37.

The breaker arms are provided with leads 47, 48 and 49, respectively, that extend to the terminals 50, 51 and 52, which are adapted to be engaged by means of a wiper 53 insulated from and carried on the shaft 19 and has a lead 54 connecting the same with a condenser 55 and to the terminal 29ᵃ.

The fixed contact points 44, 45 and 46 are grounded, and as the shaft 19 is turned and the wiper 53 engages one of the terminals 50, 51 or 52, the battery circuit will be completed with the breaker arm connected with the particular terminal selected through one of the leads 47, 48 or 49. The breaker arms are each provided with a finger 57, 58 and 59, which are adapted to bear upon a cam 60 which is fixed to a shaft 61 extending from a reduction gearing 62 that is driven by means of the motor 11 in the 110 volt line 10.

The breaker arms 34, 35 and 36 have their engageable contact points 44, 45 and 46 rigidly secured to the plate 37 at varying predetermined distances with respect to the contact points on the breaker arms and are normally retained out of contact therewith, by means of the engagement of the fingers 57, 58 and 59, respectively, by the periphery of the cam 60 which is provided with a cam-opening 60ᵃ, having its apexes spaced at an angle of 40° on the periphery of the cam.

It will be noted that the breaker arms are yieldingly urged against the cam by means of the springs 63, 64 and 65 and the contact points on the breaker arms are permitted to engage the fixed contact points only when the cam opening 60ᵃ in the cam 60 is turned and registers with the fingers on the breaker arms.

Figure 2:
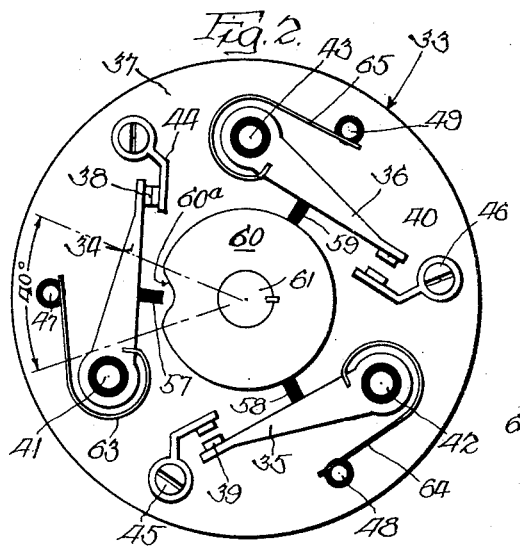
Figure 2 is an enlarged face-view illustrating a plurality of contact making and breaking elements embodied in the circuit.

It will also be noted that each of the engageable contact points 44, 45 and 46 may be so located with respect to the breaker arms, that the time during which the circuit between these two elements is closed may be varied slightly but accurately by causing one or another of the make and break devices to be included in the test circuit. The relative spacing of the contact points is shown exaggerated on the drawing for the purposes of illustration. Thus in the arrangement shown, the contact point 44 which in Fig. 2 is shown in contact with the breaker arm terminal, may remain closed while the cam rotates through 40° of its motion, the contact point 45 through 30° of rotation of the cam, and the contact point 46, through 20° rotation of the cam. Thus the time during which the circuit to the transformer under test is closed, may vary in accordance with predetermined conditions simulating those encountered when the transformer is in use. The length of time that the circuit to the transformer under test is closed determines the characteristics of the voltage impressed upon the spark gap during the test. In any case, the time during which the testing circuit is closed is of very short duration, but the circuit is closed long enough to cause the transformer X primary under test, to become saturated, the amount of saturation depending upon the time the test voltage is impressed thereon.

It has been determined by experiments that a transformer may be satisfactory at one point of saturation but not at another. The period of saturation will indicate the exact condition of the transformer under test. It is therefore desirable to test a transformer under the varying conditions made possible by the present arrangement. A transformer's ability to absorb a given and known amount of current impressed upon its primary in relation to the power output produced by the secondary is directly related to the length of time and frequency of the primary saturation period. For purposes of illustration, it may be stated that when the testing circuit connected to the transformer X under test, is closed only during 20° of each revolution of the cam 60, the circuit may be such that the period of saturation upon the primary of the transformer X is for 20° of cam revolution, and has characteristics like those encountered when the transformer is being used on devices of that frequency. Likewise, when the test circuit is closed during 30° of each revolution of the cam 60 the voltage impressed upon the transformer X has characteristics like those encountered when used on devices of that frequency, and when the testing circuit is closed for 40° out of each revolution of the cam 60, characteristics like those encountered when used on devices of that frequency. Thus by the present arrangement, conditions comparable to those encountered when the transformer is used for slow, medium or high speed devices are provided, and once the contact points 44, 45 and 46 are set, no adjustments need be made in subjecting the transformer quickly to a series of tests covering all possible speeds of devices on which it may be used. If the transformer is not in working condition or faulty, the test will show this deficiency immediately as the transformer will not function over all three time period settings.

To indicate the operation of the transformer X subjected to test under the various conditions described above, a suitable indicating circuit is provided, this indicating circuit consisting of a neon tube 66, having a condenser 67 in series therewith and connected in parallel with a spark gap 68 to two terminals 69 and 70 which may be connected across the secondary of the transformer X under test. If the transformer X under test is functioning properly, a spark will jump across the gap 68 under all of the varying conditions imposed by the testing circuit and at the same time the neon tube 66 will become luminous. The provision of two indicators 66 and 68 is desirable in that the voltage induced into the secondary S of the transformer X may not be sufficient to cause a spark to jump the gap 68 but yet be sufficient to cause the neon tube 66 to light and thus indicate to the operator the characteristics of the transformer X.

Figure 3:
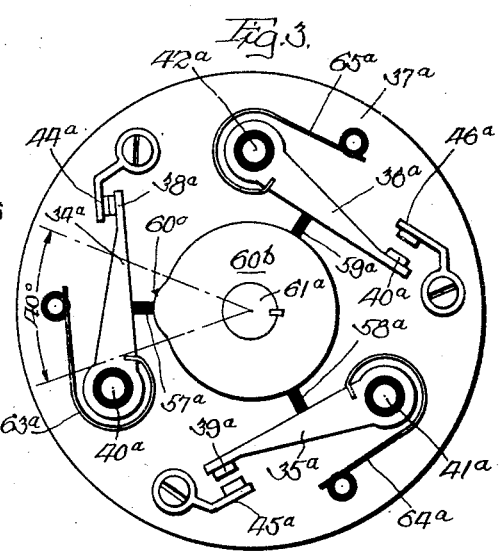
Figure 3 is a modified form of the contact making and breaking elements shown in Fig. 2.

In Fig. 3 I have shown a modified form of make and break devices employing the breaker arms 34a, 35a and 36a pivotally mounted on the studs 40a, 41a and 42a which are also provided with contact points 38a, 39a and 40a, respectively, on their top surfaces that are adapted to engage similar engageable contact points 44a, 45a, and 46a, respectively, carried in fixed relation with respect to the breaker arms on a plate member 37a. The breaker arms are each provided with the fingers 57a, 58a and 59a, respectively, that are normally adapted to engage the periphery of a cam 60b carried on the shaft 61a and which is provided with an outwardly directed cam surface 60c that is adapted to force the breaker arms outwardly upon its rotating engagement against the arms and against the tension of the springs 63a, 64a and 65a, respectively, fixed to the breaker arms.

It will be noted that with this construction of make and break devices, the contact is made upon the rotation of the cam 60b with its cam portion 60c forcing the selected breaker arm against its engageable contact point.

Different types of transformers vary with regard to the amount of windings on their primary which varies the time for heating the same preparatory to a test. The thermostatic control switch allows the full amount of heating current to flow therethrough and heat the transformer to its proper temperature before automatically becoming sufficiently heated to be distorted to open the circuit upon reaching the proper temperature.

While the forms of make and break devices shown and described are admirably adapted to fulfill the objects primarily stated, it is understood that it is not intended to confine the invention to the forms or embodiments herein disclosed, for it is susceptible of embodiment in various forms, all coming within the scope of the appended claims.

I claim:—

1. A device for testing a transformer having primary and secondary windings, means to energize the primary winding including a primary circuit and means to make and break the primary circuit, said means comprising a plurality of breaker points adapted to be selectively connected in the circuit in accordance with predetermined intervals of primary saturation of the transformer, and manually manipulative means for effecting the connection of the selected breaker points with the circuit.

2. The combination of claim 1 hereof in which said breaker points are arranged for different duration of contact and selectively controlled in accordance with the different periods of energization to the transformer to be tested.

3. An electrical testing system for ignition transformers or the like adapted for use with internal combustion engines, said system including a plurality of make and break devices, means for operating said make and break devices, a testing circuit adapted to be connected to the transformer being tested and means for selectively connecting one or another of said make and break devices in said testing circuit, the arrangement of said make and break devices and the operating means therefor being such that the time during which the testing circuit is energized is varied in accordance with pre-determined conditions simulating various engine speeds, depending upon which of said make and break devices is connected to said testing circuit.

4. The combination of claim 3 hereof in which said operating means consists of a single cam and said make and break devices being located around the periphery thereof to be operated successively thereby.

5. A device for testing a transformer having primary and secondary windings, means to energize the primary winding including a primary circuit and a plurality of make and break devices in said circuit, means for operating said make and break devices, and manually manipulative selector means for selecting and effecting the connection of any one of said breaker points to complete the circuit.

6. The combination of claim 5 hereof in which said make and break devices are each arranged for different duration of contact under the control of their operating means.

7. A device for testing a transformer having primary and secondary windings, comprising a circuit including a plurality of make and break devices for interrupting the circuit, a rotor controlling the make and break devices, said make and break devices being each arranged for different duration of contact in the circuit under the control of said rotor, and means for sequentially selecting the make and break devices during the testing of the transformer.

8. A device for testing a transformer having primary and secondary windings, means to energize the primary winding including a primary circuit and a plurality of make and break devices in the primary circuit, a motor, a rotor driven by the motor effecting the movement of said make and break devices to complete the circuit, said make and break devices being each connected for a different duration of contact under the control of said rotor.

9. A device for testing a transformer having primary and secondary windings, a primary circuit including make and break devices and motor-operated rotor means to make and break the primary circuit for pre-determined given intervals of contact, said means comprising fixed breaker points, any one of which may be selectively connected in the circuit for testing a transformer.

10. A device for testing a transformer having primary and secondary windings, means to energize the primary winding for test including a primary circuit and motor-operated means to make and break the primary circuit, said last-mentioned means comprising a plurality of breaker points adapted to be selectively connected in the circuit in accordance with predetermined intervals of primary saturation of the transformer under test.

11. A device for testing a transformer having primary and secondary windings, means to energize the primary winding including a primary circuit and motor-operated means to make and break the primary circuit, said means comprising a plurality of breaker points adapted to have different duration of timed contacts, any one of which may be selectively connected in the circuit for testing the transformer.

12. A device for testing a transformer having primary and secondary windings, means to energize the primary winding including a primary circuit and a plurality of motor-operated make and break devices, said make and break devices having predetermined characteristics simulating various saturation periods, and means for selectively positioning any one of said make and break devices in the circuit.

13. A device for testing a transformer having primary and secondary windings, means to energize the primary winding including a primary circuit and a plurality of motor-operated make and break devices to interrupt the primary circuit, and means for selectively connecting any one of said make and break devices in the circuit for testing the periods of saturation of a transformer.

14. A device for testing a transformer having primary and secondary windings, means to energize the primary winding including a primary circuit and a plurality of motor-operated make and break devices to interrupt the primary circuit, said make and break devices being set for different predetermined given intervals of contact, and a rotor coacting with the make and break devices and having a fixed cam angle and under the control of the motor for effecting the contact of said make and break devices for given intervals of contact to test a transformer under various operating conditions.

15. A device for testing a transformer having primary and secondary windings, means to energize the primary winding including a primary circuit and a plurality of motor-operated make and break devices to make and break the primary circuit, manipulative means for connecting any one of said make and break devices in the circuit, and means connected to the secondary winding of the transformer for indicating its condition during the test with each of said make and break devices.

16. A device for testing a transformer having primary and secondary windings, means to energize the primary winding including a primary circuit and a plurality of make and break devices to selectively make and break the primary circuit, said make and break devices being each arranged for a different duration of contact, and variable motor-operated means for effecting the contact of said make and break devices.

H. WALTER MITCHELL.